(12) United States Patent
Xu et al.

(10) Patent No.: US 9,710,312 B2
(45) Date of Patent: Jul. 18, 2017

(54) COMPONENT-BASED TASK ALLOCATION METHOD FOR EXTENSIBLE ROUTER

(71) Applicant: Tsinghua University, Beijing (CN)

(72) Inventors: Ke Xu, Beijing (CN); Xiaoliang Wang, Beijing (CN); Min Zhu, Beijing (CN); Dongchao Ma, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 260 days.

(21) Appl. No.: 14/572,859

(22) Filed: Dec. 17, 2014

(65) Prior Publication Data

US 2015/0172094 A1 Jun. 18, 2015

(30) Foreign Application Priority Data

Dec. 17, 2013 (CN) .......................... 2013 1 0693523

(51) Int. Cl.
*G06F 9/50* (2006.01)
*H04L 12/751* (2013.01)
*H04L 12/773* (2013.01)
*H04L 12/713* (2013.01)

(52) U.S. Cl.
CPC ............ *G06F 9/5061* (2013.01); *G06F 9/505* (2013.01); *H04L 45/02* (2013.01); *H04L 45/586* (2013.01); *H04L 45/60* (2013.01)

(58) Field of Classification Search
CPC ...................................................... H04L 45/02
See application file for complete search history.

(56) References Cited

U.S. PATENT DOCUMENTS

| | | | | |
|---|---|---|---|---|
| 7,287,063 B2 * | 10/2007 | Baldwin | ............. | G06F 11/3495 709/216 |
| 2003/0185226 A1* | 10/2003 | Tang | ....................... | H04L 45/60 370/428 |
| 2006/0010441 A1* | 1/2006 | Jahn | ........................ | H04J 14/02 718/100 |
| 2006/0136903 A1* | 6/2006 | Childress | ............ | G06F 11/1464 717/172 |
| 2007/0121503 A1* | 5/2007 | Guo | ..................... | H04L 12/5695 370/230 |
| 2007/0288618 A1* | 12/2007 | Yeo | ....................... | H04W 8/005 709/223 |
| 2009/0138615 A1* | 5/2009 | Cristallo | ................. | G06F 9/548 709/235 |

(Continued)

*Primary Examiner* — Lashonda Jacobs
(74) *Attorney, Agent, or Firm* — Kile Park Reed & Houtteman LLC

(57) ABSTRACT

The present disclosure relates to a component-based task allocation method for an extensible router, comprising: S1: selecting components that needs to be activated from a component library, generating a topology structure of the components, and measuring load of each component; S2: selecting a super master control and a backup super master control from master controls, allocating the components, generating a task allocation table and a task updating message according to dynamic allocation algorithms; and S3: receiving the task updating message from the super master control by the other master controls, and activating the components that need to be activated and registering to a component manager. Thus, the tasks can be allocated uniformly.

8 Claims, 3 Drawing Sheets

(56) References Cited

U.S. PATENT DOCUMENTS

| | | | | |
|---|---|---|---|---|
| 2014/0101226 A1* | 4/2014 | Khandekar | ......... | H04L 67/1008 |
| | | | | 709/203 |
| 2014/0359184 A1* | 12/2014 | Kang | ................... | G06F 9/4812 |
| | | | | 710/263 |
| 2015/0170078 A1* | 6/2015 | Dattaray | .......... | G06Q 10/06311 |
| | | | | 705/7.13 |
| 2015/0227586 A1* | 8/2015 | Li | ..................... | G06F 17/30477 |
| | | | | 707/769 |
| 2015/0323956 A1* | 11/2015 | Goyal | ....................... | G06F 1/04 |
| | | | | 713/600 |

* cited by examiner

COMPONENT-BASED TASK ALLOCATION METHOD FOR EXTENSIBLE ROUTER

CROSS-REFERENCE TO RELATED APPLICATION

This application claims priority to and benefits of Chinese Patent Application Serial No. 201310693523.4, filed with the State Intellectual Property Office of P. R. China on Dec. 17, 2013, the entire contents of which are incorporated herein by reference.

FIELD

The present disclosure relates to technologies of extensible routers, and more particularly to a component-based task allocation method for an extensible router.

BACKGROUND

An extensible router includes a number of router nodes that can run independently and are connected in a specific topology structure to form a function-extensible single image router. The extensible router has size extensibility, route computation extensibility, and function extensibility, and thus is deemed to be a main development trend of routers.

However, tasks of the extensible router are not collectively managed. Software modules with huge computations, such as OSPF modules, BGP modules, and routing management modules, are run in different master controls. However, loads of the software modules may be significantly different from each other and thus tasks cannot be uniformly allocated.

SUMMARY

According to an aspect of the present disclosure, a component-based task allocation method for an extensible router, the method comprising:

S1: selecting components that needs to be activated from a component library, generating a topology structure of the components, and measuring load of each component;

S2: selecting a super master control and a backup super master control from master controls, allocating the components, generating a task allocation table and a task updating message according to dynamic allocation algorithms; and S3: receiving the task updating message from the super master control by the other master controls, and activating the components that need to be activated and registering to a component manager.

The component-based task allocation method for an extensible router divides the modules into components and allocating tasks base upon the components and then allocate the components to the routers, and therefore, the tasks can be allocated uniformly.

Additional aspects and advantages of the embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION

Figure 1:
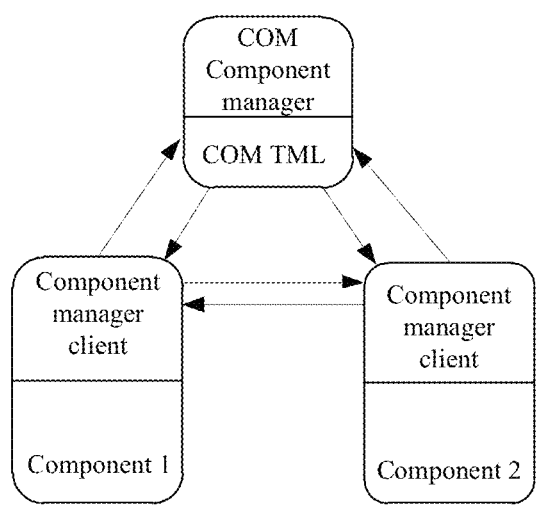
FIG. 1 is a functional block diagram showing how components intercommunicate according to an embodiment of the present disclosure.

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied. Moreover, a structure in which a first feature is "on" a second feature may include an embodiment in which the first feature directly contacts the second feature, and may also include an embodiment in which an additional feature is formed between the first feature and the second feature so that the first feature does not directly contact the second feature.

In addition, terms such as "first" and "second" are used herein for purposes of description and are not intended to indicate or imply relative importance or significance or imply a number of technical features indicated. Therefore, a "first" or "second" feature may explicitly or implicitly comprise one or more features. Further, in the description, unless indicated otherwise, "a plurality of" refers to two or more.

In embodiments of the present disclosure, a module, such as a BGP module and an RIP module, is a router software module that can process messages individually. A component is a unit of the module and a software unit that has individual functions. The module is constituted by specific components that connect in a specific manner. Different modules can share common components and are for processing specific messages. For example, both the BGP module and an OSPF module can be constituted by three components: a protocol packet processing component, a neighbor management component, and a router calculating component. Components that are not relative to protocols can be designed. By sharing the common components, efficiency of software development and a usage efficiency of software modules can be increased. A component manager is for managing registering, logging off, and information-saving of the components, and also maintaining a topology structure of the components, and also managing operations and dynamic changes of the components, such as adding/deleting, changing, and replacing of the components. In this embodiment, the component manager can also be a component. A component manager client is a telecommunication interface between the components, including component-to-component and component-to-component-manager. The component manager client shields the components from communication details of bottom layers of an operation system, and also supports heterogeneous environments. FIG. 1 is a functional block diagram showing how the components intercommunicate according to an embodiment of the present disclosure.

Also in the embodiments, each router that is added to a cascaded router is a node. In other embodiments, a rack can be a node. A super master control is the only master control node and can manage the nodes, allocate tasks, and collects information. The super master control need to maintain a component-motherboard table. A backup super master control is a backup of the super master control, and has a management mirror image of the super master control. The backup super master control takes the place of the super master control in case of failure of the super master control. If the backup super master control fails, a new backup super master control is selected. The backup super master control learns master control information of the super master control.

Figure 2:
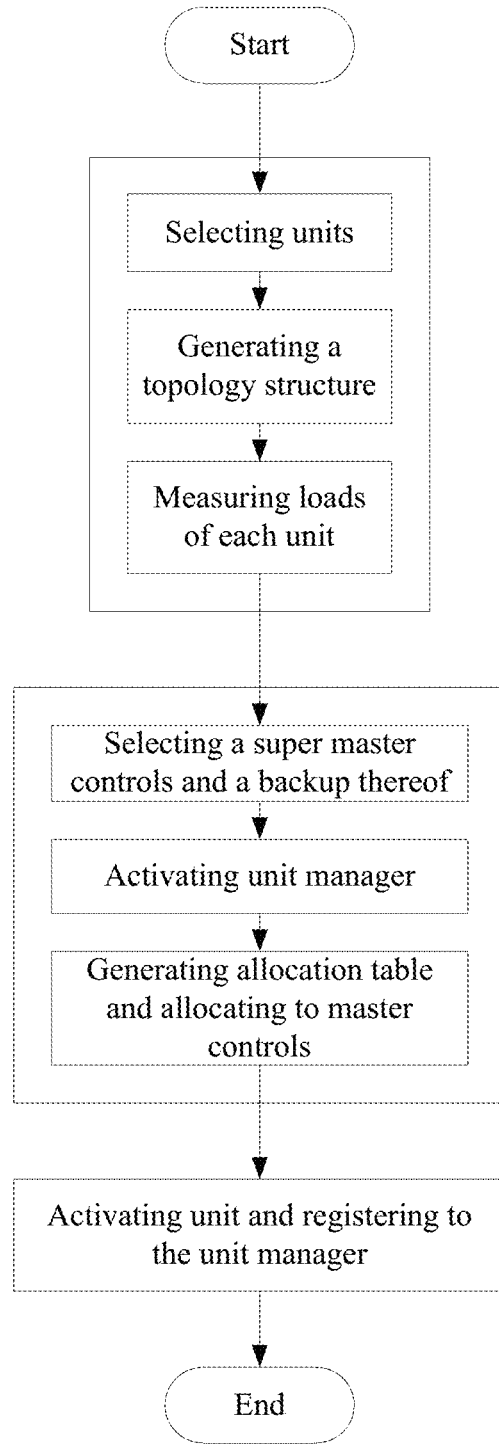
FIG. 2 shows a flowchart of a component-based task allocation method for an extensible router, according to an embodiment of the present disclosure.

FIG. 2 shows a flowchart of a component-based task allocation method for an extensible router, according to an embodiment of the present disclosure. The method includes the following steps S1-S3.

S1: selecting the components that need to be activated from a component library, generating the topology structure of the components, and measuring load of each component.

In step S2, selecting the super master control and the backup super master control from the master controls, allocating the components, generating a task allocation table and a task updating message according to dynamic allocation algorithms.

In step S3, receiving the task updating message from the super master control by the other master controls, and activating the components that need to be activated and registering to the component manager.

In this embodiment, in step S1, the load of each component is measured by: activating the components on a test router, invoking tools of an operation system of the test router to measure a CPU usage of the test router when running each component, and recording the CPU usages.

In this embodiment, if the BGP module and the OSPF protocol packet module need to be activated in the cascaded router, a BGP protocol packet processing component, a BGP neighbor management component, a BGP router calculating component, an OSPF protocol packet processing component, an OSPF neighbor management component, and an OSPF router calculating component are selected from the component library, and the topology structure of the components is generated and saved in an XML document. Then, the components are activated in the test router, and a top command of the Linux system is invoked to measure the CPU usages of when running the components and the CPU usages are recorded as Loads 1-6.

In this embodiment, in step S2, the super master control and the backup super master control are selected by a node manager module in sub-step S21. Each master control in the cascaded router is activated. When the master control X is activated or communication channels between the neighbor routers are established, a priority, a super master control domain, and a backup super master control domain of a package Hello sent from each neighbor router is checked. All master controls that can be selected as the super master control, that is, all master controls that have the priority higher than 0 and a neighbor state "bidirectional", are listed. To select the super master control and the backup super master control, the following sub-steps S211-S214 of the sub-step 21 are performed according to the list of the master controls.

In step S211, if the super master control and the backup super master control are found on a network, values of the super master control and the backup super master control are recorded for later comparisons.

In step S212, the backup super master control on the network is calculated as follow. In the list of the master controls, only the master controls that do not claim themselves as the super master control can be the backup super master control. For the master controls that claim themselves as the backup super master control and are not the super master control, that is, the master controls of which a port address belongs to the backup super master control domain and is not in the super master control domain of the package Hello, the router has the highest priority is selected as the super master control. If the priorities of the routers are equal to each other, the router has the biggest IP is selected as the super master control. If none of the master controls claims itself as the backup super master control, the master controls that claim themselves as the super master control is excluded, and the router has the highest priority in the list of the master controls is selected as the backup super master control. If the priorities of the routers are equal to each other, the router that has the biggest ID is selected as the backup super master control.

In step S213, the super master control is calculated as follow. If one or more than one master control claim itself/themselves as the super master control, that is, the port address thereof is in the super master control domain of the package Hello, then, the router that has the highest priority is selected as the super master control. If the priorities of the routers are equal to each other, the router that has the biggest ID is selected as the super master control. If no master control claims itself as the super master control, then the new selected backup super master control is set as the super master control.

In step S214, if the master control X that is activated for the calculation is the new super master control or the new backup super master control, or not the super master control any more, or not the backup super master control any more, the step S22-S23 are repeated to calculate the backup super master control and the super master control on the network.

In sub-step S22 of the step S2, the node manager module publishes an informing message after the super master control and the backup super maser control are selected. The informing message includes the node list that indicates node IDs of the super master control, the backup super master control, and the other master controls.

In a sub-step S23 of the step S2, the super master control is informed itself that itself is selected as the super master control after receiving the informing message. The task allocation module allocates task and generates the task allocation table and constructs the task updating message. In this embodiment, to realize this, the following sub-steps S231-S234 are performed. In step S231, the super master control checks the informing message sent from the node manager module to make sure if itself is the super master control. If no, an error message is generated and exit.

In step S232, the component manager is activated and initialized, the XML document of the topology structure of the components is read, functions provided by the operation system are invoked, and a communication module is initialized. The initialization includes but is not limited to an activation of Socket service and binding an address for monitoring Socket.

In step S233, the components in the topology structure are distributed according to dynamic allocation algorithms, and the task allocation table is generated. The task allocation table contains relationships between the components and the node IDs of the master controls.

Figure 3:
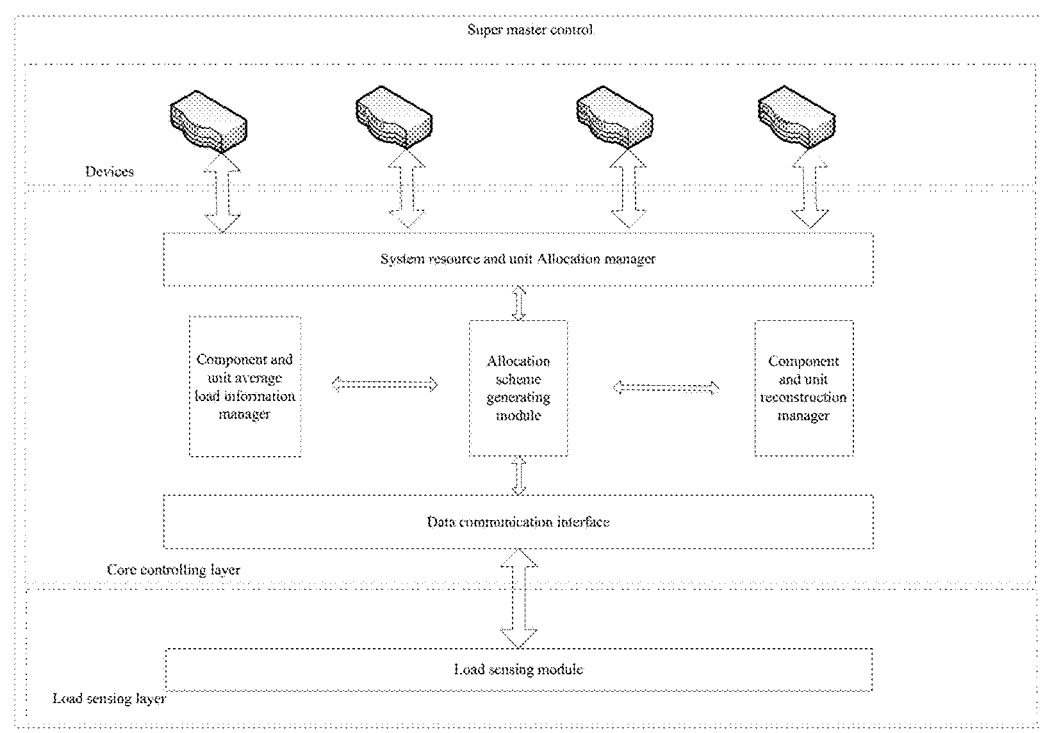
FIG. 3 is a functional block diagram of a system of a super master control according to an embodiment of the present disclosure.

Referring to FIG. 3, in a system of the super master control, a load sensing module in a load sensing layer is used for sensing the load of each part of the system and reporting to a core controlling layer. In the core controlling layer, an allocation scheme generating module performs the dynamic allocation algorithms, and calculates an optimal allocation scheme according to system information from the parts of the system, and sends the optimal allocation scheme to a system resource and component allocation manager. A module and component average load information manager calculates average load of each module and component, which can be used by the allocation scheme generating module when runs the dynamic allocation algorithms. A module and component reconstruction manager manages constitutes, connections, and reconstructions of the modules of the system. The system resource and component allocation manager receives the optimal allocation scheme and adjust allocations and connections of the modules and the components.

A function $G=(V,E)$ is used for describing network topology environments, wherein V is a node collection of devices of the network environment, and E is an edge collection. Each edge in the edge collection represents a data link of connected communication devices. Each edge $e(u,v) \in E$ has a connection cost, which represents a cost between the devices u and v. Each node $v \in V$ has a load value Load.

Overall optimization aims at two objects: one is for reducing an overall cost of communications, and another is to balance the loads of the system. As such, a function for calculating the overall optimization is set as follow:

$$F(S)=\Sigma_{e \in E}\alpha R(e)V(e)+\text{Num}(S)-\beta\{(1+\phi)L_{max}(S)-(1-\phi)L_{min}(S)-2\phi L_{avg}(S)\}$$

Wherein $\alpha$ and $\beta$ are weights (coefficients) for calculating Cost and Load, and can be dynamically adjusted according to the actual environment to which the system is applied. For any edge $i \in E$, the cost of the link is Cost(i). For the overall connection state S, a communication frequency and an average data of any edge $i \in E$ are R(i) and V(i), and a link number of the system is Num(S). $\text{Load}_{max}$ represents the highest load of all devices of the system, and $\text{Load}_{min}$ represent the lowest load of all devices of the system, $\phi$ is an adjustment coefficient.

The dynamic allocation algorithms in the step S233 include the following steps:

In step S2331, the devices are sorted in a descending order according to the loads, the devices with the highest load to the average loads are collected as the node collection $V_{top}$.

In step S2332, steps S2333-2338 are repeatedly performed to each node in the node collection $V_{top}$.

In step S2333, all nodes are checked to determine if $V=\emptyset$ is true, if yes, jump back to step 2632, if no, a value of the function F(S) is calculated and recorded, and the node with the highest load $V_{max}$ and the node with the lowest load $V_{min}$ are found out.

In step S2334, modules and components of the node with the highest load $V_{max}$ is analyzed and sorted in a descending order of the loads, and are collected into a collection $\text{List}_{comp}$.

In step S2335. Steps S2336-2338 are repeatedly performed to each node in the collection $\text{List}_{comp}$.

In step S2336, modules or components with the highest average load $\text{Comp}_{max}$ are found out, and if $\text{Comp}_{max} \notin \emptyset$ true is determined, if yes, jumps to step S2235, if no, deletes the node with the highest load from the collection $V_{top}$, and jumps to step S2332.

In step S2337, if the node with the lowest load $V_{min}$ has sufficient resource for running $\text{Comp}_{max}$ is determined according to the average loads of the modules and the components, if yes, jumps to the step S2338.

In step S2338, calculating the value of the function F(S') after $\text{Comp}_{max}$ is distributed to the node with the lowest load $V_{min}$, determining if F(S')<F(S) is true, if yes, $\text{Comp}_{max}$ is distributed to the node with the lowest load $V_{min}$ and is added to an allocation scheme Plan, deleting $\text{Comp}_{max}$ from the collection $\text{List}_{comp}$ and jumping back to step S2335, if no, analyzing if $\text{Comp}_{max}$ is a module, if yes, checking constituting information thereof and labeling the component with the highest average load as $\text{Comp}_{max}$, jumping to step S2337, if no, deleting $V_{min}$ from the collection V, and jumping back to step S2333.

In step S2339: outputting the allocation scheme Plan as the optimal allocation scheme.

In the step S3, the following sub-steps are performed:

Step S31: checking if the ID of the message is the ID of the super master control that the backup super master control records, if yes, goes to step S32, if no, exit.

Step S32: saving the task allocation table;

Step S33: comparing components that are distributed to the non-super master control in the task allocation table and components that are already activated in the non-super master control, activating the components that are distributed to the non-super master control and are not activated and registering to the component manager. This step includes the following steps:

Step S331: initializing the components.

Step S332: obtaining IP and socket monitoring port of the super control node to which the component manager client is distributed using the component manager client, constructing a registering message and registering to the component manager. The registering message includes a component ID, the ID of the node, IP address, and socket monitoring port, registering to the component manager through the component manager client using by the component, informing the component ID, the ID of the node, IP address, and socket monitoring port. The component manager update database after receiving the registering message, maintaining the component and the node ID. The component manger searches the topology structure of the components and forwards registering information including the communication address of the new registered component to association components of the new registered component, that is, the components that need to send messages to the new registered component and to receive messages from the new registered component.

In this embodiment, the master controls except the super master control and the master controls except the backup super master control can be deleted. The super master control and the backup super master control can be deleted too. The component can be deleted, added, or reactivated too.

The master controls except the super master control and the master controls except the backup super master control can be deleted by the following steps:

In step S41: deleting a master control and informing other master controls.

In step S42: the master control that is informed checking if itself is the super master control or the backup super master control, if no, printing the error message and exit.

In step S43, the component manager on the super master control checking every components in the master control that is deleted, and informing association component of each component, the association component disassociating the component.

In step S44, reallocating the components in the master control that is deleted to other master control, and updating the task allocation table.

In step S45, the super master control constructing the task updating message and sending the task allocation table to the other master controls.

In step S46: the master controls except the super master control and the backup super master control update the component thereon by performing the step S33.

The super master control can be deleted by the following steps:

In step S51: the super master control informing a deleting message to all master controls.

In step S52: the master control that is informed by the super master control checking if itself is the backup super master control, if no, printing the error message and exit.

In step S53: the task distribution module on the backup super master control deleting the super master control in the task allocation table, reallocating the components on the super master control to other master control, and constructing a new task allocation table, the backup super master control activating the component manager thereon and reading and saving the topology structure of the components.

In step S54: the backup super master control constructing the task updating message and sending the task allocation table to the other master controls.

In step S55: the master controls except the backup super master control and the backup super master control update the component thereon by performing the step S33.

The master control can be added by the following steps:
In step S61: informing the task distribution manager module of the super master control and the backup super master that a new master control is added.

In step S62: the task distribution manager module of the super master control and the backup super master saving information of the new added master control to a link table.

The component can be deleted by the following steps:

In step S71, sending logoff message to the component manager of the manager to be deleted, the component manger informing association components of the component to be deleted, the association components disassociating the component to be deleted, the component updating the topology structure of the components.

In step S72, invoking functions provided by a system of the master control that has the function of component deleting to delete the component to be deleted.

The component can be added by the following:

In step S81, adding the component need to be added and connections thereof to the XML document of the topology structure of the components.

In step S82, checking CPU usage of each router, and activating the component need to be added on a test router to measure the CPU usage when running the component to be added.

In step S83, the test router informing the super master control, the super master control allocating the component need to be added according to the CPU usage and cost of adding the component and communication cost thereof, updating the task allocation table by performing steps S233 and S234 and sending to the master control.

In step S84, activating the component and registering to the component manager, and the master control corresponding to the newly added component in the new task allocation table activating the newly added component.

The component can be reactivated by the following steps:
In step S91, deleting a component by performing steps S71-S72; and In step S92, adding a component by performing step S81-S82.

The component-based task allocation method for an extensible router divides the modules into components and allocating tasks base upon the components and then allocate the components to the routers, and therefore, the tasks can be allocated uniformly.

Reference throughout this specification to "an embodiment", "some embodiments", "one embodiment", "an example", "a specific examples", or "some examples" means that a particular feature, structure, material, or characteristic described in connection with the embodiment or example is included in at least one embodiment or example of the disclosure. Thus, the appearances of the phrases such as "in some embodiments", "in one embodiment", "in an embodiment", "an example", "a specific examples", or "some examples" in various places throughout this specification are not necessarily referring to the same embodiment or example of the disclosure. Furthermore, the particular features, structures, materials, or characteristics may be combined in any suitable manner in one or more embodiments or examples.

Although explanatory embodiments have been shown and described, it would be appreciated by those skilled in the art that changes, alternatives, and modifications may be made in the embodiments without departing from spirit and principles of the disclosure. Such changes, alternatives, and modifications all fall into the scope of the claims and their equivalents.

What is claimed is:

1. A component-based task allocation method for an extensible router, the method comprising:
   S1: selecting components that need to be activated from a component library, generating a topology structure of the components that need to be activated, and measuring load of each component;
   S2: selecting a super master control and a backup super master control from master controls, allocating the components, generating a task allocation table and a task updating message by the super master control according to dynamic allocation algorithms; and
   S3: receiving the task updating message from the super master control by other master controls, and activating the components that need to be activated and registering to a component manager,
   wherein the step S2 comprises the following sub-steps:
   S21: selecting the super master control and the backup super master control using a node manager module;
   S22: the node manager module publishing an informing message after the super master control and the backup super master control are selected, the informing message comprising a node list; and
   S23, the super master control receiving the informing message from the node manager module, allocating tasks using a resource and component allocating manager, generating the task allocation table and constructing the task updating message,
wherein the step S21 comprises the following sub-steps:
S211: recording values of the super master control and the backup super master control;
S212: calculating the backup super master control;
S213: calculating the super master control; and
S214: repeating the steps S212 and S213 if the master control that is activated for the calculation is the super master control or the backup super master control, or not the super master control any more, or not the backup super master control any more,
and the step S23 comprises the following sub-steps:
S231: the super master control checking the informing message sent from the node manager module to make sure if itself is the super master control, if no, printing an error message and exit;
S232: activating and initializing the component manager, reading the topology structure of the components, and initializing a communication module;
S233: allocating the components in the topology structure and generating the task allocation table according to dynamic allocation algorithms; and
S234: constructing the task updating message and sending the task allocation table to the master controls.

2. The method of claim 1, wherein the step S233 comprises the following sub-steps:
S2331: sorting devices of a system of the super master control in a descending order according to loads thereof, the devices with the highest load to the average load being collected to a node collection $V_{top}$;
S2332: repeating the steps S2333-2338 to each node of the node collection $V_{top}$;
S2333: checking all nodes to determine if $V=\emptyset$ is true, if yes, jumping back to step S2332, if no, recording the value of a function F(S) and finding out the node with the highest load $V_{max}$ and the node with the lowest load $V_{min}$;
S2334: analyzing the modules and the components on the node with the highest load $V_{max}$, and sorting the modules and the components in a descending order of the loads thereof, and collecting the modules and the components into a collection $List_{comp}$;
S2335: repeating the step S2336-2338 to each node in the collection $List_{comp}$;
S2336: finding out a module or a component with the highest average load, determining if $Comp_{max} \in \emptyset$ is true, if yes, jumping to step S2235, if no, deleting the node with the highest load from the collection $V_{top}$, and jumping to step 2332;
S2337: determining if the node with the lowest load $V_{min}$ has sufficient resource for running $Comp_{max}$ according to the average loads of the modules and the components, if yes, jumping to the step S2338;
S2338: calculating the value of the function F(S') after $Comp_{max}$ is distributed to the node with the lowest load $V_{min}$, determining if F(S')<F(S) is true, if yes, $Comp_{max}$ is distributed to the node with the lowest load $V_{min}$ and is added to an allocation scheme Plan, deleting $Comp_{max}$ from the collection $List_{comp}$ and jumping back to step S2335, if no, analyzing if $Comp_{max}$ is a module, if yes, checking constituting information thereof and labeling the component with the highest average load as $Comp_{max}$, jumping to step S2337, if no, deleting $V_{min}$ from the collection V, and jumping back to step S2333;

S2339: outputting the allocation scheme Plan as the optimal allocation scheme;
wherein the function F(S) is defined as follow:

$$F(S)=\Sigma_{e\in E}\alpha R(e)V(e)+\text{Num}(S)-\beta\{(1+\phi)L_{max}(S)-(1-\phi)L_{min}(S)-2\phi L_{avg}(S)\}$$

wherein $\alpha$ and $\beta$ are weights (coefficients) for calculating Cost and Load, and can be dynamically adjusted according to the actual environment to which the system is applied. For any edge $i\in E$, the cost of the link is Cost(i). For the overall connection state S, a communication frequency and an average data of any edge $i\in E$ are R(i) and V(i), and a link number of the system is Num(S), $Load_{max}$ represents the highest load of all devices of the system, and $Load_{min}$ represent the lowest load of all devices of the system, $\phi$ is an adjustment coefficient.

3. The method of claim 1, wherein the step S3 comprises the following steps:
S31: checking if an ID of the message is an ID of the super master control that the backup super master control records, if yes, goes to step S32, if no, exit;
S32: saving the task allocation table; and
S33: comparing components that are distributed to a non-super master control in the task allocation table and components that are already activated in the non-super master control, activating the components that are distributed to the non-super master control and are not activated and registering to the component manager.

4. The method of claim 1, further comprising:
S41: deleting a master control and informing other master controls;
S42: the master control that is informed checking if itself is the super master control or the backup super master control, if no, printing the error message and exit; and
S43, the component manager on the super master control checking every components in the master control that is deleted, and informing association component of each component, the association component disassociating the component;
S44, reallocating the components in the master control that is deleted to other master control, and updating the task allocation table;
S45, the super master control constructing the task updating message and sending the task allocation table to the other master controls; and
S46: the master controls except the super master control and the backup super master control update the component thereon.

5. The method of claim 1, further comprising:
S51: the super master control informing a deleting message to all master controls;
S52: the master control that is informed by the super master control checking if itself is the backup super master control, if no, printing the error message and exit;
S53: the task distribution module on the backup super master control deleting the super master control in the task allocation table, reallocating the components on the super master control to other master control, and constructing a new task allocation table, the backup super master control activating the component manager thereon and reading and saving the topology structure of the components;

S54: the backup super master control constructing the task updating message and sending the task allocation table to the other master controls; and S55: the master controls except the backup super master control and the backup super master control update the component thereon by performing the step S33.

6. The method of claim 1, further comprising:

S61: informing the task distribution manager module of the super master control and the backup super master that a new master control is added; and S62: the task distribution manager module of the super master control and the backup super master saving information of the new added master control to a link table.

7. The method of claim 1, further comprising:

S71, sending logoff message to the component manager of a manager to be deleted, the component manger informing association components of a component to be deleted, the association components disassociating the component to be deleted, the component manager updating the topology structure of the components; and S72, invoking functions provided by a system of a master control that has the function of component deleting to delete the component to be deleted.

8. The method of claim 1, further comprising:

S81, adding the component needing to be added and connections thereof to an XML document of the topology structure of the components;

S82, checking CPU usage of each router, and activating the component need to be added on a test router to measure the CPU usage when running the component to be added;

S83: the test router informing the super master control, the super master control allocating the component need to be added according to the CPU usage and cost of adding the component and communication cost thereof, updating the task allocation table and sending to the master control; and S84: activating the component and registering to the component manager, and the master control corresponding to a newly added component in a new task allocation table activating the newly added component.

* * * * *